(12) United States Patent
Elenbaas et al.

(10) Patent No.: US 12,345,926 B2
(45) Date of Patent: Jul. 1, 2025

(54) SEALING ENCLOSURE FOR A CONNECTOR ON A CABLE SUCH AS A STANDARDIZED FIBER-OPTIC CONNECTOR HAVING COORDINATED BODIES RADIALLY COMPRESSING A CABLE SEAL

(71) Applicant: COMMSCOPE TECHNOLOGIES LLC, Hickory, NC (US)

(72) Inventors: Jacob Arie Elenbaas, Heyningen (NL); Jarno Verhoeven, Rosemalen (NL)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 107 days.

(21) Appl. No.: 18/164,728

(22) Filed: Feb. 6, 2023

(65) Prior Publication Data

US 2023/0400646 A1 Dec. 14, 2023

Related U.S. Application Data

(63) Continuation of application No. 17/504,891, filed on Oct. 19, 2021, now Pat. No. 11,573,380, which is a
(Continued)

(30) Foreign Application Priority Data

Sep. 28, 2009 (EP) .................... 09012270

(51) Int. Cl.
*G02B 6/38* (2006.01)
*G02B 6/42* (2006.01)
*G02B 6/44* (2006.01)

(52) U.S. Cl.
CPC .......... *G02B 6/387* (2013.01); *G02B 6/3831* (2013.01); *G02B 6/3847* (2013.01);
(Continued)

(58) Field of Classification Search
None
See application file for complete search history.

(56) References Cited

U.S. PATENT DOCUMENTS 4,106,849 A * 8/1978 Stieff .................. G02B 6/40
                                                         385/115
4,682,848 A    7/1987 Cairns et al.
(Continued)

FOREIGN PATENT DOCUMENTS

CN    2578843 Y    10/2003
CN  201233463 Y     5/2009
(Continued)

OTHER PUBLICATIONS

Extended European Search Report for EP Application No. 09012270.6, issued by the European Patent Office, Rijswijk, Netherlands, mailed Feb. 11, 2010; 6 pages.
(Continued)

*Primary Examiner* — Andrew Jordan
(74) *Attorney, Agent, or Firm* — Merchant & Gould P.C.

(57) ABSTRACT

A sealing enclosure is configured to connect to a mating enclosure. The sealing enclosure loosely receives a connector within a connector volume so that the connector, which may be of a standard type used in electronic or optic data transmission, may be displaced within a plug face at the forward end of the connector volume. The connector may compensate variations in the position of a mating connector with respect to the mating enclosure. The sealing enclosure allows to seal off the connector volume and engage the sealing enclosure with a mating enclosure in a single motion. This is affected by having a cable seal interposed between an inner body and an outer body. If the outer body is moved forward to engage the mating connector, the cable seal is
(Continued)

squeezed between the cable and the inner body sealing off the connector volume at the rearward end of the inner body.

20 Claims, 4 Drawing Sheets

Related U.S. Application Data continuation of application No. 16/914,885, filed on Jun. 29, 2020, now Pat. No. 11,169,334, which is a continuation of application No. 14/257,476, filed on Apr. 21, 2014, now Pat. No. 10,754,100, which is a continuation of application No. 14/052,460, filed on Oct. 11, 2013, now Pat. No. 9,122,021, which is a continuation of application No. 12/924,459, filed on Sep. 28, 2010, now Pat. No. 8,556,520.

(52) U.S. Cl.
CPC ......... *G02B 6/3887* (2013.01); *G02B 6/3891* (2013.01); *G02B 6/3879* (2013.01); *G02B 6/3893* (2013.01); *G02B 6/4248* (2013.01); *G02B 6/4428* (2013.01); *Y10T 29/49174* (2015.01)

(56) References Cited

U.S. PATENT DOCUMENTS

| | | |
|---|---|---|
| 4,784,459 A | 11/1988 | Jenkins |
| 4,789,351 A | 12/1988 | Fisher, Jr. et al. |
| 4,824,198 A | 4/1989 | Anderton |
| 4,846,714 A | 7/1989 | Welsby et al. |
| 5,140,207 A | 8/1992 | Baumeister et al. |
| 5,142,601 A * | 8/1992 | Shibata ............... G02B 6/3869 385/86 |
| 5,212,752 A | 5/1993 | Stephenson |
| 5,214,732 A | 5/1993 | Beard |
| 5,241,611 A | 8/1993 | Gould |
| 5,271,080 A | 12/1993 | Hopper et al. |
| 5,480,315 A | 1/1996 | Martinelli |
| 5,619,610 A | 4/1997 | King |
| 5,670,747 A | 9/1997 | Lawer et al. |
| 5,825,954 A | 10/1998 | Dunn et al. |
| 6,206,714 B1 | 3/2001 | Bernardini |
| 6,579,014 B2 | 6/2003 | Melton et al. |
| 6,629,782 B2 | 10/2003 | McPhee |
| 6,648,520 B2 | 11/2003 | McDonald et al. |
| 6,884,113 B1 | 4/2005 | Montena |
| 6,962,445 B2 | 11/2005 | Zimmel et al. |
| 7,090,406 B2 | 8/2006 | Melton et al. |
| 7,090,407 B2 | 8/2006 | Melton et al. |
| 7,090,409 B2 | 8/2006 | Nakajima et al. |
| 7,113,679 B2 | 9/2006 | Melton et al. |
| 7,137,742 B2 | 11/2006 | Theuerkorn et al. |
| 7,234,877 B2 | 6/2007 | Sedor |
| 7,244,066 B2 | 7/2007 | Theuerkorn |
| 7,264,402 B2 | 9/2007 | Theuerkorn et al. |
| 7,338,214 B1 | 3/2008 | Gurreri et al. |
| 7,357,579 B2 | 4/2008 | Feldner |
| 7,549,802 B2 | 6/2009 | Bell et al. |
| 7,572,065 B2 | 8/2009 | Lu et al. |
| 7,585,116 B2 | 9/2009 | Cull et al. |
| 7,600,928 B2 | 10/2009 | Rubinstein et al. |
| 7,641,395 B2 | 1/2010 | Ringgenberg et al. |
| 7,641,396 B2 | 1/2010 | Feldner |
| 7,641,398 B2 | 1/2010 | O'Riorden et al. |
| 7,645,162 B2 | 1/2010 | Kadar-Kallen et al. |
| 7,686,519 B2 | 3/2010 | Lu |
| 7,744,288 B2 | 6/2010 | Lu et al. |
| 7,758,389 B2 | 7/2010 | Kadar-Kallen et al. |
| 7,785,015 B2 | 8/2010 | Melton et al. |
| 7,785,019 B2 | 8/2010 | Lewallen |
| 7,788,015 B2 | 8/2010 | Geveci |
| 7,794,155 B1 | 9/2010 | Haley et al. |
| 7,972,067 B2 | 7/2011 | Haley et al. |
| 7,988,368 B2 | 8/2011 | Sakurai et al. |
| D671,899 S | 12/2012 | Verhoeven |
| 8,506,173 B2 * | 8/2013 | Lewallen ............ G02B 6/3885 385/71 |
| 8,511,907 B2 | 8/2013 | Ringgenberg et al. |
| 8,523,454 B2 | 9/2013 | Ringgenberg et al. |
| 8,550,721 B2 | 10/2013 | Ringgenberg et al. |
| 8,550,722 B2 | 10/2013 | Ringgenberg et al. |
| 8,556,520 B2 | 10/2013 | Elenbaas et al. |
| 8,628,252 B2 | 1/2014 | Matsumoto et al. |
| 8,735,722 B2 * | 5/2014 | Scholten ............. H02G 15/013 174/77 R |
| 8,757,276 B2 | 6/2014 | Alff et al. |
| 8,757,891 B2 | 6/2014 | Ringgenberg et al. |
| 8,770,862 B2 * | 7/2014 | Lu ....................... G02B 6/3893 385/86 |
| 8,784,139 B2 * | 7/2014 | Durand ............... G02B 6/3893 439/695 |
| 8,853,537 B2 * | 10/2014 | Kempeneers ......... H02G 15/04 174/77 R |
| 8,917,967 B2 * | 12/2014 | Kempeneers ........ H01R 13/516 385/139 |
| 8,920,044 B2 * | 12/2014 | Shimazu ............. G02B 6/3879 385/72 |
| 9,122,021 B2 | 9/2015 | Elenbaas et al. |
| 9,235,010 B2 * | 1/2016 | Islam .................. G02B 6/3888 |
| 9,270,048 B2 * | 2/2016 | Harwath ............... H01R 13/52 |
| 9,312,676 B2 * | 4/2016 | Kempeneers ......... F16J 15/02 |
| 9,492,890 B2 | 11/2016 | Brockmann ....... B23K 26/0673 |
| 9,494,745 B2 * | 11/2016 | Iizumi ............... G02B 6/44775 |
| 9,507,102 B2 * | 11/2016 | Conner ................ H01R 13/582 |
| 9,671,569 B2 * | 6/2017 | Kempeneers ........ H02G 15/013 |
| 9,696,500 B2 * | 7/2017 | Barnette, Jr. .......... G02B 6/381 |
| 9,703,051 B2 | 7/2017 | Lichoulas et al. |
| 9,709,756 B2 * | 7/2017 | Klavuhn ............. G02B 6/3888 |
| 9,726,831 B2 * | 8/2017 | Gniadek .............. G02B 6/3885 |
| 9,781,493 B2 * | 10/2017 | Takeuchi ................ H04Q 1/06 |
| 9,864,156 B1 * | 1/2018 | Menguy ............... G02B 6/4403 |
| 9,874,703 B2 * | 1/2018 | Islam .................. G02B 6/3888 |
| 9,877,660 B2 * | 1/2018 | O'Connell ........... A61B 5/0215 |
| 9,882,362 B2 * | 1/2018 | Carapella ............ G02B 6/4448 |
| 9,897,766 B2 * | 2/2018 | Gniadek .............. G02B 6/3821 |
| 9,913,585 B2 * | 3/2018 | McCaffrey ......... A61B 5/02141 |
| 9,915,788 B2 * | 3/2018 | Iizumi ............... G02B 6/44384 |
| 9,952,397 B2 * | 4/2018 | Hanson ............... G02B 6/4448 |
| 10,061,090 B2 | 8/2018 | Coenegracht |
| 10,061,091 B2 * | 8/2018 | Kempeneers ........... H02G 3/22 |
| D833,978 S * | 11/2018 | Smajda ..................... D13/133 |
| 10,130,269 B2 * | 11/2018 | McCaffrey ......... A61M 25/0026 |
| 10,133,010 B2 * | 11/2018 | Collier ................ G02B 6/3849 |
| 10,180,541 B2 * | 1/2019 | Coenegracht ........ G02B 6/3825 |
| 10,194,812 B2 * | 2/2019 | McCaffrey ........... A61B 5/0215 |
| 10,199,766 B2 * | 2/2019 | Smajda ................. H01R 13/635 |
| 10,201,284 B2 * | 2/2019 | McCaffrey ........... A61B 5/0215 |
| 10,209,456 B2 * | 2/2019 | Collier ................ G02B 6/3866 |
| 10,234,641 B2 * | 3/2019 | Hill ..................... G02B 6/3887 |
| 10,259,910 B2 * | 4/2019 | Wang ..................... C08K 3/36 |
| 10,288,820 B2 * | 5/2019 | Coenegracht ........ G02B 6/3825 |
| 10,288,821 B2 * | 5/2019 | Isenhour ............. G02B 6/3889 |
| 10,288,829 B2 * | 5/2019 | Claessens ............ F16J 15/0887 |
| 10,291,969 B2 * | 5/2019 | Takeuchi ................ H04Q 1/13 |
| 10,295,759 B2 * | 5/2019 | Wong .................. G02B 6/3869 |
| 10,310,206 B2 * | 6/2019 | Takeuchi ................ H04Q 1/025 |
| 10,330,869 B2 * | 6/2019 | Gniadek .............. G02B 6/3885 |
| 10,359,594 B2 * | 7/2019 | Takeuchi ................. H02B 1/00 |
| 10,401,578 B2 * | 9/2019 | Coenegracht ........ G02B 6/3894 |
| 10,422,962 B2 | 9/2019 | Coenegracht |
| 10,444,442 B2 * | 10/2019 | Takano ................ G02B 6/3893 |
| 10,451,811 B2 * | 10/2019 | Coenegracht ........ G02B 6/3871 |
| 10,473,868 B2 * | 11/2019 | Compton ............... G02B 6/389 |
| 10,473,873 B2 * | 11/2019 | Diepstraten .......... G02B 6/4471 |
| 10,502,907 B2 * | 12/2019 | Wang .................. G02B 6/3893 |
| 10,509,187 B2 * | 12/2019 | Carapella ............. H02G 3/083 |
| 10,520,686 B2 * | 12/2019 | Wong .................... G02B 6/387 |
| 10,564,363 B1 * | 2/2020 | Corl .................... G02B 6/262 |
| 10,606,008 B2 * | 3/2020 | Claessens ............ G02B 6/4446 |
| 10,613,278 B2 * | 4/2020 | Kempeneers ....... H02G 15/013 |

(56) References Cited

U.S. PATENT DOCUMENTS

| | | | |
|---|---|---|---|
| 10,646,122 B2* | 5/2020 | McCaffrey | A61B 5/02028 |
| 10,712,511 B2* | 7/2020 | Wong | G02B 6/3833 |
| 10,754,100 B2 | 8/2020 | Elenbaas et al. | |
| 10,761,288 B2* | 9/2020 | Leichter | G02B 6/44775 |
| 10,775,580 B2* | 9/2020 | Coenegracht | G02B 6/4442 |
| D898,672 S* | 10/2020 | Smajda | D13/146 |
| 10,795,095 B2* | 10/2020 | Takano | G02B 6/3893 |
| 10,795,106 B2* | 10/2020 | Takeuchi | G02B 6/3897 |
| D900,751 S* | 11/2020 | Smajda | D13/146 |
| 10,830,960 B2 | 11/2020 | Elenbaas | |
| 10,852,487 B1* | 12/2020 | Ignatius | G02B 6/3879 |
| 10,908,368 B2* | 2/2021 | Yamazaki | G02B 6/38875 |
| 10,914,908 B2* | 2/2021 | Hanson | H02G 3/081 |
| 10,921,528 B2* | 2/2021 | Wong | G02B 6/3885 |
| 10,955,636 B2* | 3/2021 | Coenegracht | G02B 6/4472 |
| 10,962,731 B2* | 3/2021 | Coenegracht | G02B 6/4471 |
| 10,973,418 B2* | 4/2021 | McCaffrey | A61B 5/6852 |
| 10,976,504 B2* | 4/2021 | Wang | G02B 6/3825 |
| 10,976,512 B2* | 4/2021 | Carapella | G02B 6/4457 |
| 10,983,284 B2* | 4/2021 | Coenegracht | G02B 6/3825 |
| 11,041,993 B2* | 6/2021 | Wong | G02B 6/387 |
| 11,048,048 B2* | 6/2021 | Bretz | G02B 6/4479 |
| 11,086,090 B2* | 8/2021 | Wan | G02B 6/4471 |
| 11,099,343 B2* | 8/2021 | Claessens | F16J 15/0887 |
| 11,115,735 B2* | 9/2021 | Rousseaux | H04B 10/40 |
| 11,169,334 B2 | 11/2021 | Elenbaas et al. | |
| 11,175,466 B2* | 11/2021 | Gniadek | G02B 6/3821 |
| 11,185,244 B2* | 11/2021 | McCaffrey | A61B 5/02007 |
| 11,204,472 B1* | 12/2021 | Tseng | G02B 6/3825 |
| 11,219,741 B2* | 1/2022 | Fleming | A61B 5/02141 |
| 11,226,456 B2* | 1/2022 | Coenegracht | G02B 6/3825 |
| 11,235,124 B2* | 2/2022 | Rogers | A61M 25/0023 |
| 11,256,041 B2* | 2/2022 | Wong | G02B 6/381 |
| 11,272,850 B2* | 3/2022 | Finn | A61B 5/02007 |
| 11,275,221 B2* | 3/2022 | Takano | G02B 6/3817 |
| 11,330,989 B2* | 5/2022 | McCaffrey | A61B 5/6852 |
| 11,330,994 B2* | 5/2022 | Rogers | A61B 5/6851 |
| 11,353,664 B1* | 6/2022 | Wong | G02B 6/3821 |
| 11,372,189 B2* | 6/2022 | Coenegracht | G02B 6/3878 |
| 11,422,317 B2* | 8/2022 | Lee | G02B 6/3825 |
| 11,459,831 B2* | 10/2022 | Sipple | E21B 19/12 |
| 11,460,656 B2* | 10/2022 | Claessens | G02B 6/4444 |
| 11,480,750 B2* | 10/2022 | Takeuchi | G02B 6/4453 |
| 11,520,111 B2* | 12/2022 | Takano | G02B 6/3885 |
| 11,543,601 B1* | 1/2023 | Xiao | G02B 6/3893 |
| 11,550,105 B2* | 1/2023 | Kempeneers | H02G 15/013 |
| 11,573,380 B2* | 2/2023 | Elenbaas | G02B 6/3887 |
| 11,573,382 B2* | 2/2023 | Islam | G02B 6/4285 |
| 11,585,994 B2* | 2/2023 | Islam | G02B 6/4279 |
| 11,604,320 B2* | 3/2023 | Dannoux | G02B 6/3825 |
| 11,698,500 B2* | 7/2023 | Hanson | G02B 6/445 385/135 |
| 11,701,012 B2* | 7/2023 | McCaffrey | A61B 5/02141 600/486 |
| 11,719,900 B2* | 8/2023 | Carapella | G02B 6/4454 385/135 |
| 11,726,272 B2* | 8/2023 | LeFebvre | G02B 6/3885 385/134 |
| 11,754,791 B2* | 9/2023 | Coenegracht | G02B 6/3821 385/60 |
| 11,822,142 B2* | 11/2023 | Coenegracht | G02B 6/4471 |
| 11,850,030 B2* | 12/2023 | McCaffrey | A61B 5/02007 |
| 11,901,669 B2* | 2/2024 | Tseng | H01R 13/62905 |
| 11,921,329 B2* | 3/2024 | Lu | G02B 6/3849 |
| 11,927,809 B2* | 3/2024 | Bretz | G02B 6/4479 |
| 11,971,585 B2* | 4/2024 | Van Baelen | G02B 6/3849 |
| 12,053,265 B2* | 8/2024 | McCaffrey | A61B 5/0215 |
| 12,055,762 B2* | 8/2024 | Takeuchi | G02B 6/3504 |
| 12,055,769 B2* | 8/2024 | Hubbard | G02B 6/3825 |
| 2003/0010519 A1 | 1/2003 | Pieck | |
| 2003/0063867 A1 | 4/2003 | McDonald et al. | |
| 2004/0047566 A1 | 3/2004 | McDonald et al. | |
| 2005/0041928 A1 | 2/2005 | Zimmel et al. | |
| 2005/0191910 A1 | 9/2005 | Bertini et al. | |
| 2005/0215101 A1 | 9/2005 | Pepe | |
| 2005/0281510 A1 | 12/2005 | Vo et al. | |
| 2005/0281511 A1 | 12/2005 | Ringgenberg et al. | |
| 2006/0035509 A1 | 2/2006 | O'Connor | |
| 2006/0089049 A1 | 4/2006 | Sedor | |
| 2006/0177181 A1 | 8/2006 | Szilagyi | |
| 2007/0160327 A1 | 7/2007 | Lewallen et al. | |
| 2007/0207668 A1 | 9/2007 | Masuzaki | |
| 2008/0026647 A1 | 1/2008 | Boehnlein et al. | |
| 2008/0157582 A1 | 7/2008 | Bertele | |
| 2008/0310796 A1 | 12/2008 | Lu | |
| 2009/0003793 A1 | 1/2009 | Bell et al. | |
| 2009/0060420 A1 | 3/2009 | Cull et al. | |
| 2009/0148102 A1 | 6/2009 | Lu et al. | |
| 2009/0191750 A1 | 7/2009 | Kadar-Kallen et al. | |
| 2010/0086257 A1 | 4/2010 | Ringgenberg et al. | |
| 2010/0215322 A1 | 8/2010 | Matsumoto et al. | |
| 2010/0260456 A1 | 10/2010 | Alcaraz et al. | |
| 2010/0310213 A1 | 12/2010 | Lewallen et al. | |
| 2010/0329611 A1 | 12/2010 | Haley et al. | |
| 2011/0075971 A1 | 3/2011 | Elenbaas et al. | |
| 2012/0071019 A1* | 3/2012 | Takamatsu | H01R 13/6315 439/370 |
| 2012/0148204 A1 | 6/2012 | Ringgenberg et al. | |
| 2012/0170613 A1 | 7/2012 | Ringgenberg et al. | |
| 2012/0170614 A1 | 7/2012 | Ringgenberg et al. | |
| 2012/0170893 A1 | 7/2012 | Ringgenberg et al. | |
| 2012/0170898 A1 | 7/2012 | Ringgenberg et al. | |
| 2012/0174378 A1 | 7/2012 | Ringgenberg et al. | |
| 2012/0285741 A1* | 11/2012 | Scholten | H02G 15/007 174/77 R |
| 2014/0029897 A1* | 1/2014 | Shimazu | G02B 6/3807 385/76 |
| 2014/0037253 A1 | 2/2014 | Elenbaas et al. | |
| 2014/0226937 A1 | 8/2014 | Elenbaas et al. | |
| 2014/0308835 A1* | 10/2014 | Scholten | H02G 15/007 439/279 |
| 2015/0110447 A1 | 4/2015 | Elenbaas et al. | |
| 2015/0212284 A1 | 7/2015 | Lichoulas et al. | |
| 2017/0184798 A1 | 6/2017 | Coenegracht | |
| 2019/0025523 A1 | 1/2019 | Coenegracht | |
| 2020/0400895 A1 | 12/2020 | Elenbaas et al. | |
| 2022/0107468 A1 | 4/2022 | Elenbaas | |
| 2023/0400646 A1* | 12/2023 | Elenbaas | G02B 6/3891 |

FOREIGN PATENT DOCUMENTS

| | | |
|---|---|---|
| DE | 35 14 010 C1 | 7/1986 |
| EP | 1 775 612 A2 | 4/2007 |
| EP | 2 239 605 A1 | 10/2010 |
| EP | 2 302 431 A1 | 3/2011 |
| JP | 1-134314 | 5/1989 |
| JP | 2007-108741 | 4/2007 |
| JP | 2007-240856 | 9/2007 |
| JP | 2009-109578 | 5/2009 |
| JP | 2011070191 | 4/2011 |
| WO | 01/59501 A1 | 8/2001 |
| WO | 2005/122340 A1 | 12/2005 |
| WO | 2008/029072 A1 | 3/2008 |
| WO | 2008/157582 A1 | 12/2008 |
| WO | 2009/100796 A1 | 8/2009 |

OTHER PUBLICATIONS

Response to European Search Report for EP Application No. 09 012 270.6 filed with the European Patent Office on May 17, 2010; 7 pages.
European Examination Report for EP Application No. 09 012 270.6 dated Jan. 25, 2011; 5 pages.
Response to Jan. 25, 2011 European Examination Report for EP Application No. 09 012 270.6 filed with the European Patent Office on Aug. 3, 2011; 18 pages.
European Examination Report for EP Application No. 09 012 270.6 dated Jun. 25, 2014; 5 pages.
Response to Jun. 25, 2014 European Office Action for European Patent Application No. 09 012 270.6 mailed Oct. 27, 2014; 16 pages.

(56) References Cited

OTHER PUBLICATIONS

Extended European Search Report for EP Application No. 14163884. 1, issued by the European Patent Office, Munich, Germany, mailed Jun. 26, 2014; 7 pages.
Response to Jun. 26, 2014 Extended European Search Report for Application No. 14163884.1 filed with the European Patent Office on Jan. 29, 2015; 18 pages.
Extended European Search Report for Application No. 17168994.6 mailed Oct. 23, 2017, 9 pages.
Extended European Search Report for Application No. 21209454.4 mailed Feb. 18, 2022, 7 pages.
U.S. Office Action from U.S. Appl. No. 14/052,460 mailed Sep. 29, 2014.
Preliminary Amendment for U.S. Appl. No. 14/257,476, filed May 1, 2014; 4 pages.
Non-Final Office Action for U.S. Appl. No. 14/257,476 mailed Jul. 17, 2014; 14 pages.
Applicant Initiated Interview Summary for U.S. Appl. No. 14/257,476 mailed Aug. 20, 2014; 8 pages.
Amendment and Response filed Oct. 17, 2014 in U.S. Appl. No. 14/257,476; 18 pages.
Applicant Initiated Interview Summary for U.S. Appl. No. 14/257,476 mailed Nov. 4, 2014; 3 pages.
Applicant Summary of Interview with Examiner for U.S. Appl. No. 14/257,476, filed Nov. 20, 2014; 1 page.
Final Office Action for U.S. Appl. No. 14/257,476 mailed Dec. 3, 2014; 16 pages.
RCE and Amendment and Response filed Feb. 3, 2015 in U.S. Appl. No. 14/257,476; 15 pages.
Non-Final Office Action for U.S. Appl. No. 14/257,476 mailed Mar. 30, 2015; 15 pages.
Preliminary Amendment for U.S. Appl. No. 14/584,230, filed Jan. 14, 2015; 10 pages.

\* cited by examiner

SEALING ENCLOSURE FOR A CONNECTOR ON A CABLE SUCH AS A STANDARDIZED FIBER-OPTIC CONNECTOR HAVING COORDINATED BODIES RADIALLY COMPRESSING A CABLE SEAL

CROSS REFERENCE TO RELATED APPLICATIONS

This application is a continuation of application Ser. No. 17/504,891, filed Oct. 19, 2021, now issued as U.S. Pat. No. 11,573,380, which is a continuation of application Ser. No. 16/914,885, filed Jun. 29, 2020, now issued as U.S. Pat. No. 11,169,334, which is a continuation of Ser. No. 14/257,476, filed Apr. 21, 2014, now issued as U.S. Pat. No. 10,754,100, which is a continuation of application Ser. No. 14/052,460, filed Oct. 11, 2013, now issued as U.S. Pat. No. 9,122,021, which is a continuation of application Ser. No. 12/924,459, filed Sep. 28, 2010, now issued as U.S. Pat. No. 8,556,520, which claims the benefit of European Patent Application No. 09012270.6, filed Sep. 28, 2009, the disclosures of which are incorporated herein in their entirety by reference.

BACKGROUND

The invention relates to a sealing enclosure for a connector on a cable, such as a standardized fiber-optic connector.

SUMMARY

According to the invention, one such sealing enclosure may include a cable seal adapted to sealingly engage the cable; an inner body comprising a connector volume adapted to receive the connector, the connector volume being open at least at a rearward end, and the cable seal is arranged at the rearward end of the connector volume; and an outer body adapted to slide over the inner body to a forward position, comprising at least one locking element that is adapted to axially secure the sealing enclosure to a mating enclosure if the outer body is in the forward position.

Another such sealing enclosure according to the invention may include a connector adapted to be mounted on an end of a cable, an inner body adapted to receive the cable and having a connector volume opening into a plug face at a forward end, and an outer body surrounding the inner body and being movable relative thereto.

Furthermore, the invention relates to a method for sealing a connection of a connector to an adaptor by a sealing assembly comprising a sealing enclosure and a mating enclosure, the method comprising the steps of sliding an outer body, a cable seal and an inner body of the sealing enclosure over a cable, mounting the connector on the cable, and coupling the inner body to the mating enclosure.

In the following, the direction "forward" is defined for the sealing enclosure as facing in the direction of the mating enclosure as seen from the sealing enclosure. The direction "rearward" designates the opposite direction, i.e. the direction facing away from the mating enclosure. For the mating enclosure, these directions are reversed: The "forward" direction for the mating enclosure points to the sealing enclosure and thus corresponds to the rearward direction of the sealing enclosure. Consequently, the "rearward" direction of the mating enclosure faces away from the sealing enclosure and corresponds to the forward direction of the mating enclosure.

The common forward-rearward direction of the sealing enclosure and the mating enclosure is also termed as axial direction.

From the prior art, the sealing enclosures of the type mentioned above are used as connector plugs or connector adaptors, as shown e.g. in U.S. Pat. No. 7,338,214 B1. As shown therein, the inner body may be configured as a plug body and the outer body as a shell which has a bayonet-style locking section. In the plug body and the mating enclosure, standardized connectors are fixedly mounted at a predetermined position within the enclosure.

The problem encountered with connectors of the type shown in U.S. Pat. No. 7,338,214 B1 is that they are cumbersome to be operated if not much space is available and especially if the mating connector to which the connector is to be coupled is situated on a circuit board. This is especially the case if the mating connector is part of a component such as an amplifier or transceiver.

Due to the number of parts, the connector of U.S. Pat. No. 7,338,214 B1 requires many steps for its assembly on site, often under time pressure and in limited space. This is prone to faults such as damage to the connectors or incomplete sealing.

The invention strives to solve these problems by providing a sealing enclosure that is both easy to be assembled and mounted on site and that at the same time reliably seals the connector from harsh environmental conditions.

This aim is achieved according to the invention for a sealing enclosure as mentioned above in that in the forward position, the outer body extends beyond the cable seal in the rearward direction and the cable seal is compressed by the outer body.

This solution effects that in a single motion the sealing enclosure may both be brought into engagement with the mating enclosure and the connector be sealed as the cable seal is compressed and thus tightened. In order to engage the locking element on the outer body, the operator has to move the outer body in the forward position by sliding it over the inner body. While moving the outer body into the forward position, the cable seal is automatically tightened and seals off the connector volume at a rearward end.

The above object is also solved for a sealing enclosure as mentioned above, in that the optical connector is received loosely in the forward opening and may be displaced in and/or perpendicular to the forward-rearward direction. This solution allows the connector to move freely with limited travel within the sealing enclosure. Thus, the connector may compensate variations in the position of the mating connector. The variable position of the connector within the forward opening, i.e. the plug face of the sealing enclosure, increases the freedom where the mating enclosure may be attached. This facilitates greatly the mounting of the mating enclosure in the field because close tolerances in the position of the mating connector do not need to be observed.

The sealing enclosure according to the invention is especially applicable for all types of standardized connectors in communication technology, especially for fiber-optic connectors such as LC-type connectors, or electronic connectors such as RJ-type connectors.

In comparison with the enclosure shown in U.S. Pat. No. 7,338,214 B1, the compression fitting which has to be mounted in a separate step is replaced by the cable seal which is automatically tightened in the forward position of the outer body. The connector is loosely received in the inner body and not fixed to an intermediate adaptor.

The above concept may be further improved if the following features are added. It is to be noted that the following features may be added individually and independently of each other.

In one improved further embodiment, for example, the outer body may be of a substantially hollow cylindrical shape, in which the inner body is received, which may also be of essentially cylindrical shape. Thus, an annular space is defined between the inner and the outer body if the outer body is in the forward position, which may also be of essentially cylindrical shape.

In the forward position, the outer body may, at the rearward end, extend beyond the inner body, so that the cable seal is securely held between the inner and the outer body.

According to another improvement, the sealing enclosure may further comprise a strain relief member that may be connected to the outer body. Further, the strain relief element may function as an additional seal and may sealingly abut the outer body. Alternatively, the cable seal may be sufficiently compressed in the forward position of the outer body to also work as a strain relief element or support the additional strain relief member. This is due to the compression of the cable seal, which is thereby pressed against the cable and—via friction—secures the sealing enclosure at its position on the cable via friction.

The at least one locking element serves to axially secure the sealing enclosure to the mating enclosure. The locking element may be of the bayonet-type in one preferred embodiment. The bayonet-type is advantageous, as it combines the forward motion, which leads to the sealing of the connector volume by the cable seal at the rearward end of the sealing enclosure, with a limited rotational locking motion for the axial lock. Due to the limited rotational motion, the torsion introduced into the cable seal is limited in the bayonet-style locking element. Of course, instead of the bayonet-type style, other locking elements may be used, such as a thread. A threaded connection however, may require several rotations in order to ensure a tight connection. This in turn may increase torsional strain on the cable seal compared to a bayonet coupling.

To facilitate and thus ensure the sealing of the connector volume at the rearward end, the inner body may be provided according to another preferred embodiment with a clamping section which may open in the rearward direction. Thus, the cable seal may be slid along the cable into the clamping section. The clamping section may have a retainer which is open in the rearward direction for receiving the cable seal. In the forward position of the outer body, the clamping section may be radially compressed onto the cable seal, which in turn is radially pressed onto the cable and thus seals of any gap between the cable and the cable seal. The clamping section may be radially elastic, e.g. by having radially deflectable, preferably elastic tongues which extend from the inner body along the cable in the rearward direction. The diameter spanned by these tongues is, in their neutral, non-displaced state, larger than the outer diameter of the cable seal, so that the cable seal may be received in the clamping section without using much pressure from the outer body.

The outer body may be provided at its rearward end with a closure section that may essentially comprise a wall section that faces the cable seal and is pressed against the cable seal or the clamping section if the outer body is in the forward position or is being moved into this position. In another embodiment, the outer body may not have any sealing function at all but only serves to lock the sealing enclosure with a mating enclosure. In this case, the sealing of the connector volume may be effected only by the inner body which is therefore provided with the necessary seals and sealing surfaces. However, to increase the tightness of the sealing enclosure not only the connector volume may be sealed, but also the space between the inner and the outer body.

The outer body may be provided with an engagement surface that is adapted to engage the clamping section and compress or deflect it radially around the cable seal if the outer body is in the forward position or moved into this position. The engagement surface may be a tapered or stepped cylindrical surface or wall, or a surface or wall of frusto-conical shape. At its forward end, the inner diameter of the engagement surface may be larger than the outer diameter of the clamping section. At its rearward end, the inner diameter of the engagement surface may be smaller than the outer diameter of the clamping section.

Particularly if the locking element is of the type that is rotated in order to be locked, it is preferred that the inner body is provided with at least one positive locking element that prevents a relative rotation between the inner body and the mating enclosure once the inner body and the mating enclosure are at least partly coupled. The positive locking element may be configured as a radially protruding rib extending along the cable direction away from the rearward end, or as a correspondingly formed groove or recess.

In a further improvement, the inner body may be provided at its forward end with a front seal, such as an O-ring, a circumferential and/or a forward-facing sealing surface. The front seal preferably surrounds the plug face in which the connector volume ends.

The connector volume may be of cylindrical or frusto-conical shape with the largest diameter located at the plug face. The diameter may taper towards the rearward end. At the rearward end, the diameter of the connector volume is preferably larger than the cable diameter, and at the plug face the diameter is preferably larger than the largest dimension of the connector in the radial dimension, i.e. perpendicular to the axial direction. The part of the connector volume that has a larger diameter than the connector may extend in one preferred embodiment for at least the connector length in the rearward direction from the plug face into the inner body. This allows for a loose reception of the complete connector within the connector volume, so that the connector may move at least in the direction perpendicular to the axial direction in the plug face.

The mating enclosure that is adapted to mate with the sealing enclosure in any one of its above-described configurations may comprise a preferably cylindrical guiding surface which is adapted to receive the plug section of the inner body. The inner contour of the mating enclosure may in particular correspond to the outer contour of at least the front part of the plug body, allowing for a snug fit with only small play. The guiding surface may also be provided with at least one positive locking element that is adapted to engage the at least one positive locking element of the sealing enclosure.

In order to provide adequate sealing, the mating enclosure may be provided with at least one sealing surface. One such sealing surface, preferably cylindrical in shape, may engage the circumferential surface of the inner body sealingly to affect a sealing of the radial gap between the inner body and the mating enclosure. Of course, the sealing may also take place on a forward facing surface of the inner body surrounding the plug face. In this case, the mating enclosure preferably provides a plane wall facing the plug face and a gasket may be interposed between the plug face and the mating enclosure. This sealing surface of the mating enclosure may be a part of the guiding surface.

The mating enclosure preferably comprises a central opening in which the connector and the cable are loosely received, so that in the coupled state, the position of the connector may vary both within the sealing enclosure and the mating enclosure. This may be achieved by dimensioning the central opening-like the connector volume-so that it is larger than the largest radial dimension of the connector.

Fastening elements, such as holes for the insertion of screws or clips may be provided on the mating enclosure so that it can be fixed on a component such as a circuit board or a transceiver and the like. The fastening elements may be arranged on a flange section of the mounting enclosure.

In the following, the invention is exemplarily explained with reference to an embodiment which combines the above-mentioned features. Of this combination, any feature may be omitted or added depending on whether the effect that is associated with this feature is desired or not.

BRIEF DESCRIPTION OF THE DRAWINGS

In the figures.

DETAILED DESCRIPTION

First, the sealing enclosure according to the invention is described with reference to FIGS. 1 and 2.

Figure 1:
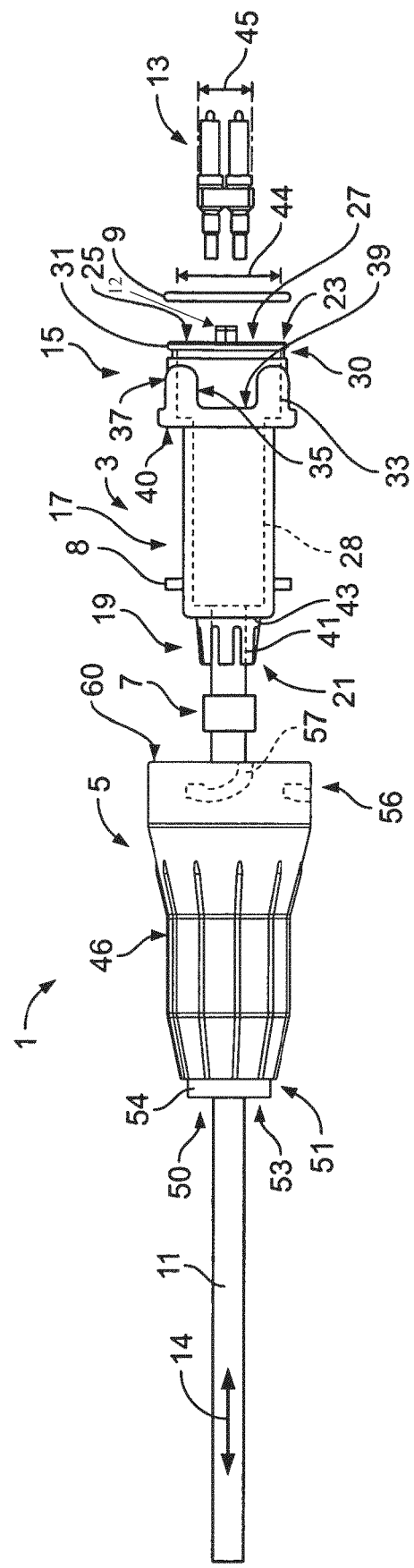
FIG. 1 shows a schematic rendition of a sealing enclosure according to the invention in an exploded side view.

In the embodiment of FIG. 1, a sealing enclosure 1 is shown that comprises an inner body 3, an outer body 5 and a cable seal 7 interposed between the inner body 3 and the outer body 5.

The cable seal 7 may consist of a single elastomeric ring with preferably rectangular cross-section in the circumferential direction. In addition to the cable seal 7, the sealing enclosure 1 may comprise other members such as an e.g. annular spring element 8 and an O-ring 9, that are also arranged between the inner body 3 and the outer body 5.

The outer body 5 may be moved relative to the inner body 3, preferably both slid along the inner body 3 and rotated with respect to the inner body 3. If the outer body 5 is slid over the inner body 3, there is a generally annular space 10 between the two. The annular space 10 extends parallel to a cable 11, which may be a fiber optic cable, over the entire length of the outer and inner body (see FIG. 2).

The sealing enclosure 1 is adapted to be mounted on a cable 11, such as a fiber-optic cable. The sealing enclosure 1 further is adapted to sealingly enclose a connector 13 which is mounted on an end 12 of the cable 11. The connector 13 may be of a standardized type used in communication technology, in particular, as shown, a dual LC-connector for the transmission of optical data signals.

The inner body 3 may be of essentially sleeve-like configuration. It represents a continuous outer wall mechanically shielding the connector volume in the radial direction, i.e. in any direction perpendicular to the cable 11. The inner body 3 may further be of generally elongated shape extending with its largest dimension along the cable 11 in an axial, forward-rearward direction 14. The inner body 3 is preferably of generally cylindrical shape and may comprise a plug section 15, a support section 17 and a clamping section 19 which all may have a generally cylindrical outer contour. The inner body 3 is adapted to be mounted on and slid along the cable 11.

The clamping section 19 is located at a rearward end 21, whereas the plug section 15 is located at a forward end 23 of the inner body 3. As a naming convention, all directions relating to the sealing enclosure and facing towards the end 12 of the cable 11 or, the mating enclosure or the connector 13, respectively, are termed the forward direction F (FIG. 2). All directions facing away from the end 12 of the cable 11, the mating enclosure or the connector 13 are termed rearward directions R (FIG. 2).

The plug section 15 encloses a forward facing plug face 25, which, in the present invention, is preferably completely open in the forward direction F and continues in the rearward direction R into the inner body 3 as a connector volume 27. The connector volume 27 constitutes the hollow interior of the inner body 3.

Figure 2:
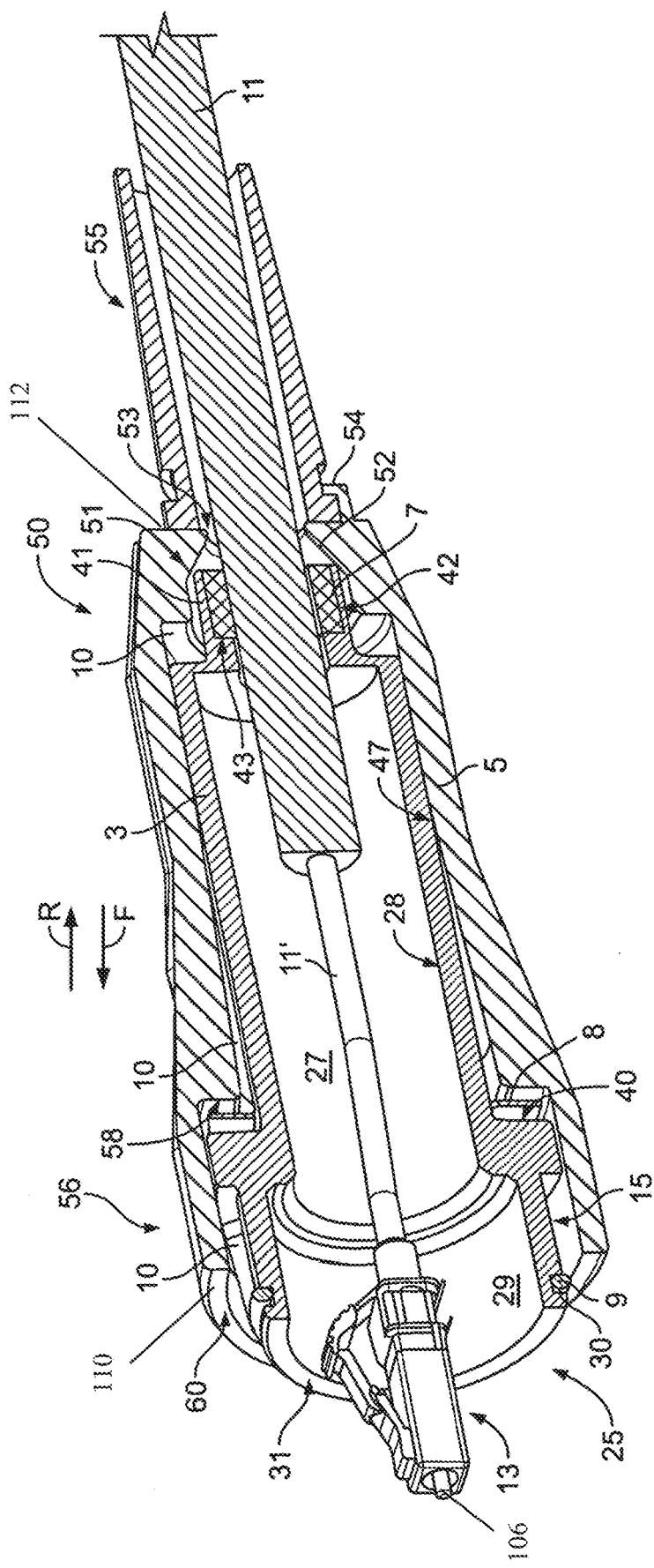
FIG. 2 shows the sealing enclosure of FIG. 1 in an assembled state in a schematic perspective and cross-sectional view.

The connector volume 27 may be of stepped cylindrical shape as shown in FIG. 2, having an inner wall 28. The connector volume 27 is dimensioned to loosely receive the connector 13 at least in a forward section 29. The forward section 29 extends over more than half, preferably over at least almost the complete axial length of the connector 13 in the axial direction. Thus, the connector 13 is received loosely, i.e. displaceable preferably both in the axial direction and in the plane of the plug face 25, in the connector volume 27. In the embodiment of FIG. 2, the forward section 29 is of a larger diameter than the rearward part of the connector volume 27 to provide more space for the connector 13. Alternatively, the connector volume 27 may also be of straight cylindrical, or of generally conical shape tapering in the rearward direction.

The plug section 15 is provided with at least one front sealing surface 29, which in the embodiment of FIG. 1, is established by the O-ring 9. The O-ring 9 may be inserted into a circumferential groove 30 close to the forward end 23. For additional or alternative sealing, an annular front wall section 31 enclosing the plug face 25 and facing in the forward direction F may also serve as a front sealing surface if pressed e.g. against a gasket of the mating connector (not shown).

The plug section 15 may comprise at least one positive locking element 33, which has preferably two opposing stop surfaces 35, 37 pointing in opposite circumferential directions about the cable 11 and the plug face 25. The at least one positive locking element 33 may be shaped as a protrusion protruding radially from the plug section 15 and extending in the forward-rearward direction 14, or as a groove open at its forward end, recessed radially in the plug section 15 and extending in the forward-rearward direction 14.

Furthermore, the plug section 15 may have a stop surface 39 facing in the forward direction. The stop surface 39 serves as a limitation to the depth over which the inner body may be inserted into the mating enclosure. At its rearward end, a rearward facing shoulder 40 serves as another stop surface that limits the insertion depth of the inner body 3 into the outer body 5.

As shown in FIG. 1, the plug section 15 may have an outer diameter different from, in particular larger than, the remaining sections of the inner body 3.

The support section 17 is of essentially smooth cylindrical shape. It may extend over more than half of the length of the inner body 3 along the cable 11, i.e. in the forward-rearward direction. It serves both a support and guidance surface for the outer body 5 and as a handle to facilitate installment and sliding of the inner body 3 on the cable 11. The outer diameter of the support section 17 may be larger than the outer diameter of the clamping section 19.

The clamping section 19 is configured to be deformed, particularly compressed, in the radial direction, i.e. perpendicular to the cable 11. In one embodiment, the clamping section 19 may include radially displaceable tongues 41 that may be spaced equidistantly about the perimeter of the rearward end 21 of the inner body 3, i.e. about the rearward opening in which the cable is received, and extend away from the rearward end essentially parallel to the forward-rearward direction, i.e. along the cable 11. The tongues 41 define a retainer 42 (FIG. 2) for receiving the cable seal 7 in the annular space between the tongues 41 and the cable 11. If the cable seal 7 is received in the retainer 42 at the clamping section 19, the tongues 41 are radially overlapping the outer surface of the cable seal 7 as shown in FIG. 2.

Depending on the specific way in which the cable seal 7 is inserted into the retainer 42, the inner diameter of the retainer 42 may be smaller or larger than the outer diameter of the uncompressed cable seal 7: If the cable seal 7 and the inner body 3 are preassembled, the inner diameter of the retainer 42 is preferably smaller than the outer diameter of the cable seal 7 so that the cable seal 7 is firmly held within the retainer by being radially compressed. In addition, the retainer 42 may engage behind the cable seal to prevent its slipping out if the inner body 3 and the cable seal 7 are slid together along the cable 11 in the forward direction F. Further, the inner diameter of the cable seal 7 received in the un-deformed clamping section 19 may be larger than the outer diameter of the cable 11 to facilitate the sliding along the cable 11.

If the cable seal 7 is inserted into the retainer 42 after both the cable seal 7 and the inner body have been mounted onto the cable 11, the inner diameter of the retainer 42 may be larger than the outer diameter of the cable seal 7 so that it may be easily pushed into the retainer 42 in the field. In this embodiment, the cable seal 7 may be used to temporarily fix the inner body on the cable 11, if it is pressed onto the cable 11 when received in the retainer 42.

The clamping section 19 is provided with a rearward facing wall 43, shown in FIG. 2. The wall 43 constitutes a sealing surface, against which the cable seal 7 may be pressed. In the wall 43 there is an opening for the cable 11, the diameter of the opening being smaller than the outer diameter of the cable seal 7. This opening connects to the connector volume 27. The wall 43 delimits the retainer 42 in the rearward direction R and represents a sealing surface against which the cable seal 7 abuts if the enclosure is coupled to the mating enclosure.

The inner diameter of the inner body 3 is dimensioned so that the cable 11 or a strand 11' of the cable 11 is received loosely and the inner body 3 may be slid along the cable. The connector volume 27 including the plug face 25 has, at least at its forward section 28, an inner width 44 that is larger than the largest radial dimension 45 of the connector 13 perpendicular to the forward-rearward direction. The connector 13 may thus be loosely received in the plug face 25 and the connector volume 27 at least in the region immediately behind the plug face 25.

The inner body 3 is received in the outer body 5, by sliding the latter over the former. The overall shape of outer body 5 may be the shape of a cylindrical or, as shown, frusto-conical hollow shell. The length of the outer body 5 in the forward-rearward direction 14 may be about the same as the length of the inner body 3. The rearward end 21 of the inner body 3 is covered completely by the outer body 5 if the sealing enclosure 1 is coupled or ready to be coupled to the mating enclosure. A gripping structure 46 comprising protrusions and/or recessions may facilitate the handling of the outer body 5.

The interior of the outer body 5 may comprise several sections of different diameter. The axial positions of these sections match the positions of the plug section 15, the support section 17 and the clamping section 19 in the state shown in FIG. 2, i.e. if the sealing enclosure 1 is ready to be coupled to the mating enclosure.

The support section 17 may, in one embodiment, act as a guiding surface, with the outer body 5 having a matching, smooth inner guiding surface 47, which is of slightly larger diameter than that of the support section 17. The inner surface 47 may widen slightly, preferably conically, in the forward direction F so that the inner body 3 is received self-centeringly without the danger of becoming wedged in the outer body 5.

At its rearward end 50, the interior of the outer body 5 is provided with a closure section 51, in which the clamping section 19 is received if the sealing enclosure 1 is coupled to the mating enclosure. The closure section 51 engages behind the cable seal 7 as seen from the connector 13. It is provided with an engagement surface shaped as a tapering inner wall 52. At its forward end the closure section has an inner diameter that is larger than the outer diameter of the clamping section 19. The inner diameter of the wall 52 at the rearward end of the closure section 51 is smaller than the outer diameter of the clamping section 19 or the tongues 41, respectively. If the outer body 5 is being slid over the inner body 3, the tapering wall 52 (FIG. 2) will gradually compress the tongues 41 and the cable seal 7 received therein in the radial direction. The wall 52 ends in the rearward direction R in an opening 53 through which the cable 11 may pass.

A support element 54 of a cage-like structure, into which a strain-relief 55 may be axially inserted, may be provided at the rearward end 50 of the outer body 5. The strain relief 55 is held in the support element by a positive lock. The strain relief 55 is secured axially by the support element 54. In FIG. 1, the strain relief 55 is not shown. At the rearward end 50, an opening for passing the cable 11 therethrough is also provided.

At the forward end 56 of the outer body 5, the interior of the outer body 5 forms an enlarged section compared to the surface 47 to accommodate the enlarged plug section 15 of the inner body. At least one locking element 57, e.g. of the bayonet type, or a thread preferably may be present at the forward end 56 of the outer body, preferably on the interior side facing the plug section 15.

The outer body 5 may be provided with an annular abutment surface 58 at the rearward end of the forward part 29. The abutment surface 58 faces the shoulder 40 of the inner body in the axial direction. If the sealing enclosure is coupled to the mating enclosure, the outer body assumes its forward position, in which the spring 8 may be compressed between the shoulder 40 and the abutment surface 58 to bias the inner body 3 away from the outer body 5 and to securely lock the bayonet connection between the two.

The outer body 5 may be further provided with a front sealing surface 60 which faces in the forward direction F and surrounds the inner body 3 at its forward end. The front sealing surface 60 may be used as an additional seal besides the O-ring 9 to seal off the connector volume 27 and the space 10.

Figure 3:
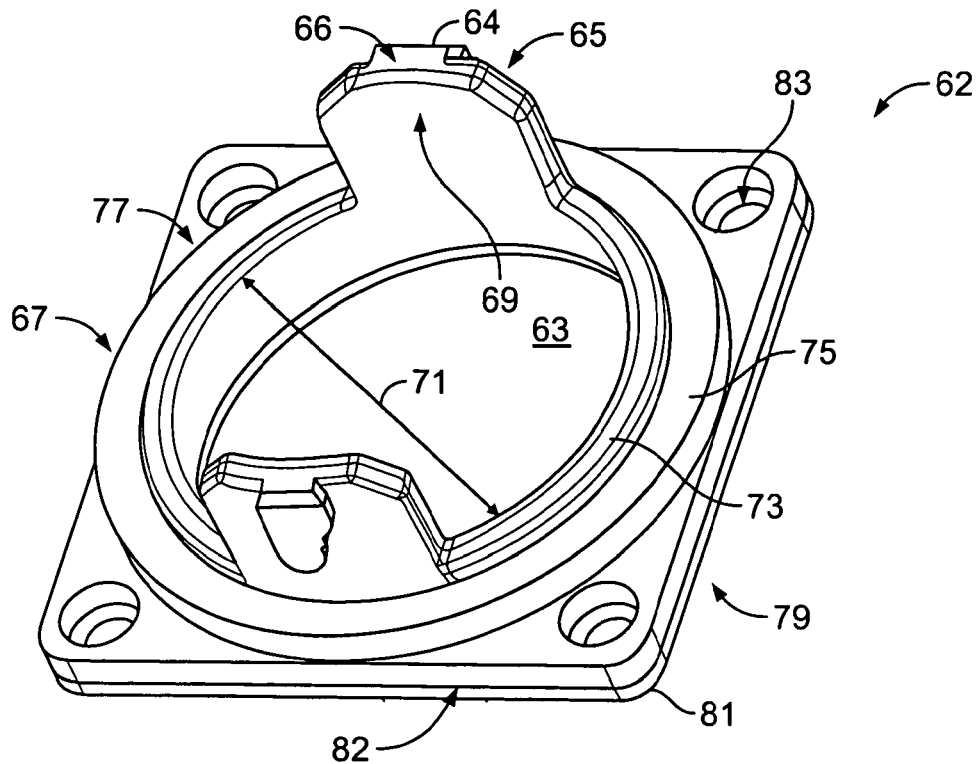
FIG. 3 shows a schematic rendition of a mating enclosure for the sealing enclosure of FIGS. 1 and 2 in a schematic perspective view.
Figure 4:
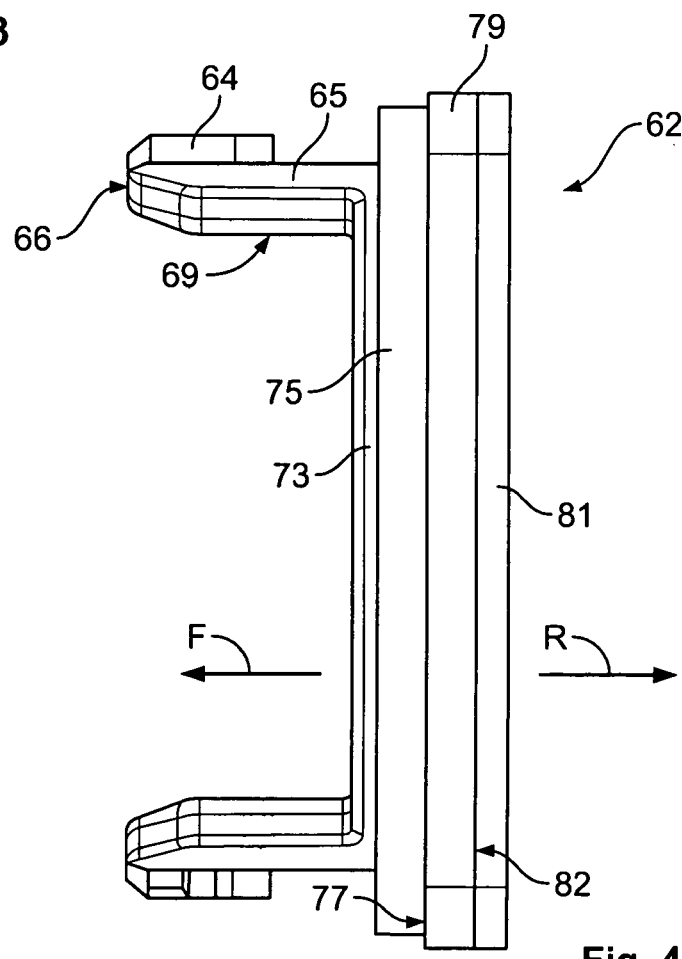
FIG. 4 shows the mating enclosure of FIG. 3 in a schematic side view.

Next, an embodiment of a mating section 62 is described exemplarily with reference to FIGS. 3 and 4.

The mating enclosure 62 has a central opening 63 of which the internal width in the radial direction is larger than the largest dimension of the connector 13 in the radial direction.

The mating enclosure 62 is further provided with at least one locking element 64 that matches the at least one locking element 57 of the outer body 5. In particular, as shown in FIG. 1, the at least one locking element 64 may comprise a protrusion 65, to enable a bayonet-type locking with the outer body 5.

As shown in FIG. 3, the locking element 64 may be positioned on two preferably inelastic tongues that protrude from a forward end of the mating enclosure 62 in the forward direction. Two or more of these locking elements may be provided if desired.

In the embodiment of FIG. 3, the protrusions 65 serve also as positive locking elements which engage between the positive locking elements 33 of the inner body 3 to prevent relative rotation between the inner body 3 and the mating enclosure 62. The forward end 67 of the protrusions 65 is designed to abut the stop surface 39 of the inner body 3.

The inner surface of the protrusions 65 is a part of a preferably continuous cylindrical inner surface 69 which continues in the forward-rearward or axial direction to enclose the central opening 63. The inner surface 69 constitutes both a guiding surface and a sealing surface for the inner body 3, in particular the sealing surface 29 or the O-ring 9, respectively. The inner diameter of the inner surface 69 is only slightly larger than the diameter at the forward end 23 of the inner body 3 to ensure a snug fit between the inner body 3 and the mating enclosure 62. The diameter 71 is, however, smaller than the outer diameter of the O-ring 9 so that the O-ring 9 is in sealing contact with the inner surface 69 if the inner body 3 is inserted into the mating enclosure 62.

The mating enclosure 62 has also a preferably annular collar 73 which is of smaller height in the axial direction than the protrusions 65. The collar 73 forms a support for a gasket 75 on its outer circumference. The gasket 75 is adapted to abut against the front sealing surface 60 of the outer body 5 once the sealing enclosure 1 and the mating enclosure 62 are fully coupled.

The forward face 77 of the mating enclosure 62 is formed by a flange 79 which is provided at its rearward face with a gasket 81. Holes 83 may be provided to receive fastening elements.

The gasket 81 is adapted to be sealingly pressed against a component such as a circuit board or an electric or optical amplifier, transceiver or the like, so that no contaminations may reach the connector volume 27 via the rearward face 82 of the mating enclosure 62. The sealing engagement between the O-ring 9 and the inner surface 69 prevents also contaminations such as dirt and moisture from entering the connector volume 27 through the plug face. The optional engagement between the sealing surface 60 and the gasket 75 seals off the space 10 between the inner body 3 and the outer body 5 and, of course, presents another barrier for dirt and moisture against entering the connector volume 27.

Thus, the connection between the connector 13 and its matching adaptor (not shown) may be completely sealed off with the sealing enclosure 1 and the mating enclosure 62 in their coupled state according to the invention. The size of the connector volume 27 and the central opening 63 in the radial direction ensures that the connector 13 is received loosely. The movability of the connector 13 within the sealing enclosure 1 and the mating enclosure 62 allows compensating variations in the position of the matching adaptor within the central opening 63. Thus, the mating enclosure 62 may be placed at a position where the sealing by the gasket 81 is most effective without regard to the position of the adapter matching the connector 13.

The sealing of the connector volume 27 and preferably also of the space 10 between the inner body 3 and the outer body 5 is effected at the rearward end in a single motion during the coupling of the sealing enclosure 1 and the mating enclosure 62. This is explained in the following.

On site, an operator shortens the cable 11 to the appropriate length that is needed for the desired connection to a component e.g. an SFP transceiver on a printed circuit board having a dual LC-adaptor. Of course, any other component may be used as well.

Before or after shortening the cable 7, the operator first slides the outer body 5 onto the cable with rearward end 50 of the outer body 5 facing away from the cable end 12. After this, the operator mounts the cable seal 7 and then, the inner body 3 with the forward end 23 facing to the cable end 12.

The cable seal 7 may, however, also be pre-assembled with the inner body 3 and be mounted and slid along the cable together with the inner body. The O-ring 9 may also already be pre-assembled on the inner body 3 or may be mounted on site. Finally, the operator mounts the connector 13 onto the end of the cable 11. Now, the sealing enclosure 1 is mounted in the configuration shown in FIG. 1.

If, starting from the position shown in FIG. 1, the sealing enclosure 1 is to be coupled to a mating enclosure 62 (FIG. 3), first, the connector 13 is mated to a corresponding adaptor (not shown). Then, the inner body 3 is slid forward on the cable 11 until engagement with the mating enclosure 62. The stop surface 39 prevents that the inner body 3 is inserted too deeply into the mating enclosure. In the shown embodiment, this engagement leads also to a positive lock between the inner body 3 and the mating enclosure 62. The positive lock prevents rotation of the inner body 3 with respect to the mating enclosure 62.

Next, the outer body 5 is slid forward on the cable 11 over the inner body 3 into its forward position in order to bring the locking element 57 of the outer body 5 into engagement with a matching locking element on the mating enclosure 62.

If the cable seal is not yet received in the retainer 42, the outer body 5 in one embodiment may automatically push the cable seal 7 along the cable 11 in the forward direction F into the retainer 42.

Preferably, the outer body 5 is guided in the forward-rearward direction, i.e. along the cable 11, by the support section 17 to further facilitate the coupling process. Near the end of the forward motion of the outer body 5, the clamping section 19 is compressed around the cable seal 7 by the tapering wall 52. The radial compression leads to a tight fit of the cable seal 7 on the cable 11 and to a lengthening of the cable seal 7 in the axial direction so that the cable seal 7 presses against wall 43. Thus the rearward end of the connector volume is sealed off. If the axial length of the cable seal is chosen so that it projects in the rearward direction from the clamping section, the space 10 may also be sealed by the tapering wall 52 pressing directly against cable seal 7.

During the forward motion, the locking elements of the outer body are brought into engagement with the locking elements of the mating enclosure 62. At the end of the forward motion of the outer body 5 relative to the inner body 3 and the mating enclosure 62, the outer body is rotated with respect to the inner body 3 which is locked non-rotationally to the mating enclosure 62 due to the locking elements 35, 37, 65. This leads to a full engagement of the locking elements and a completion of the connection. At the same time the spring element 8 is compressed axially between the outer and the inner bodies 3, 5. The compression of the spring element 8 may be released somewhat at the end of the rotation by allowing the outer body 5 to move away from the mating enclosure 62 at the end of the rotation and snap into a recess. Thus, the outer body 5 and the mating enclosure 62 are locked non-rotationally at this position. Release of the locking engagement may only be affected after the outer body 5 is moved towards the mating enclosure 62 against the action of the spring 8.

At the forward position, the O-ring 9 is in sealing engagement with the inner surface 69, and the front surface 60 is pressed into the gasket 75.

Figure 5:
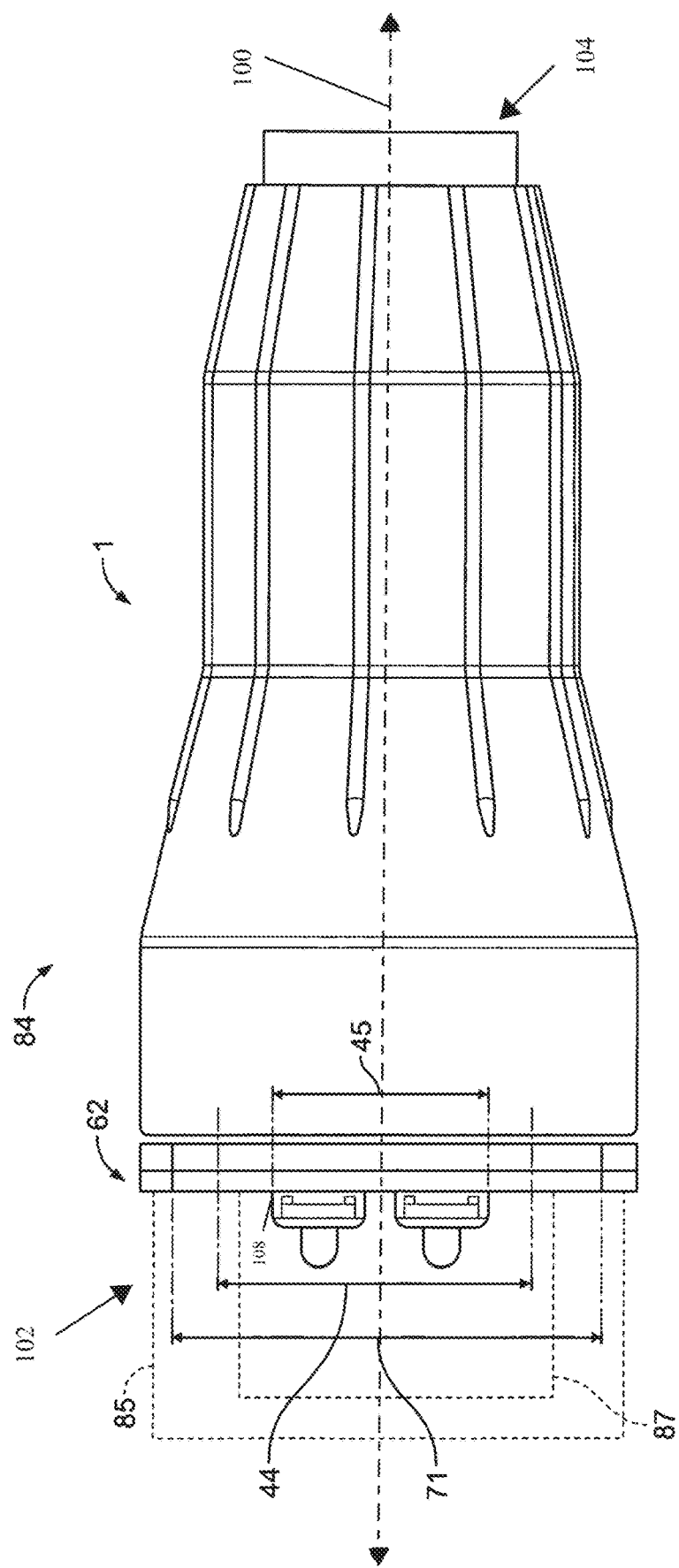
FIG. 5 shows the sealing assembly comprising the sealing enclosure of FIG. 1, 2 and the mating enclosure of FIG. 3, 4 in the plug state in a schematic side view.

FIG. 5 shows a sealing assembly 84 comprising sealing enclosure 1 and the mating enclosure 62 in the coupled state, i.e. the outer body 5 in the forward position, without strain relief. The mating enclosure 62 is mounted on a component 85 that is shown schematically using phantom lines. As can be seen, the inner widths 44, 71 of the connector volume 27 and of the central opening 63 are larger than the largest radial dimension 45 of the connector 13 so that the connector 13 may be moved within the mounted sealing enclosure 1 and mating enclosure 62 to adapt to the actual position of an adaptor 87 within the mating enclosure 62. The overall configuration of the sealing enclosure 1 allows for an easy single-handed mounting operation. The sealing and the locking of the sealing enclosure 1 and the mating enclosure 62 is affected in a single motion.

Referring to the figures, in an example a sealing assembly 84 extends along an axis 100 from a front end 102 of the sealing assembly to a rear end 104 of the sealing assembly. The sealing assembly 84 includes a cable 11; a fiber optic connector 13 positioned at a front end 12 of the cable 11, the fiber optic connector including a ferrule 106 terminating an optical fiber (not shown) of the cable 11; a first body 3 extending along the axis 100 from a front end 23 of the first body to a rear end 21 of the first body, at least a portion 108 of the fiber optic connector 13 extending beyond the front end of the first body, the first body including: a tapered portion 19; a cable seal positioned in the tapered portion, the cable seal being adapted to sealingly engage the cable; a positive locking element configured to engage a positive locking element of a mating enclosure; and a cable receiving volume 27 positioned in front of the cable seal; and a second body 5 extending along the axis from a front end 110 of the second body 5 to a rear end 112 of the second body, the second body being adapted to advance along the axis 100 between a rearward position (FIG. 2) of the second body relative to the first body and a forwardmost position (FIG. 5) of the second body relative to the first body, wherein the sealing assembly is configured such that advancing of the second body forwardly to the forwardmost position without rotation of the second body about the axis causes the cable seal to compress radially towards the axis against the cable while a portion 11' of the cable 11 within the cable receiving volume 27 remains loosely received within the cable receiving volume 27; and wherein in the forwardmost position, the first body extends forwardly beyond the front end of the second body.

What is claimed is:

1. A sealing assembly, the sealing assembly extending along an axis from a front end of the sealing assembly to a rear end of the sealing assembly, and comprising:
   a cable;
   a fiber optic connector positioned at a front end of the cable, the fiber optic connector including a ferrule terminating an optical fiber of the cable;
   a first body extending along the axis from a front end of the first body to a rear end of the first body, at least a portion of the fiber optic connector extending beyond the front end of the first body, the first body including:
   a tapered portion;
   a cable seal positioned in the tapered portion, the cable seal being adapted to sealingly engage the cable;
   a positive locking element configured to engage a positive locking element of a mating enclosure; and
   a cable receiving volume positioned in front of the cable seal; and
   a second body extending along the axis from a front end of the second body to a rear end of the second body, the second body being adapted to advance along the axis between a rearward position of the second body relative to the first body and a forwardmost position of the second body relative to the first body,
   wherein the sealing assembly is configured such that advancing of the second body forwardly to the forwardmost position without rotation of the second body about the axis causes the cable seal to compress radially towards the axis against the cable while a portion of the cable within the cable receiving volume remains loosely received within the cable receiving volume; and
   wherein in the forwardmost position, the first body extends forwardly beyond the front end of the second body.

2. The sealing assembly of claim 1, wherein the positive locking element of the first body includes a groove.

3. The sealing assembly of claim 1, wherein the positive locking element of the first body is configured to prevent relative rotation between the first body and the mating enclosure when the positive locking element of the first body and the positive locking element of the mating enclosure are engaged with each other.

4. The sealing assembly of claim 1, wherein the first body is an inner body and the second body is an outer body configured to advance along the axis over a portion of the inner body.

5. The sealing assembly of claim 1, wherein the second body is rotatable about the axis and about the first body.

6. The sealing assembly of claim 1, wherein the second body is configured to mate with the mating enclosure.

7. The sealing assembly of claim 1, wherein the tapered portion narrows towards the rear end of the first body.

8. The sealing assembly of claim 1, wherein the cable seal is positioned in a retainer defined by the first body.

9. The sealing assembly of claim 1, wherein the cable seal is positioned at the rear end of the first body.

10. The sealing assembly of claim 1, further comprising a strain relief member positioned rearward of the second body.

11. The sealing assembly of claim 1, wherein in the forwardmost position, the second body extends rearwardly beyond the rear end of the first body.

12. The sealing assembly of claim 1, wherein the first body fully surrounds another portion of the fiber optic connector.

13. An assembly, comprising:
 a mating enclosure including a fiber optic adapter and a first positive locking element; and
 a sealing assembly configured to sealingly mate with the mating enclosure, including:
  a cable;
  a fiber optic connector positioned at a front end of the cable, the fiber optic connector including a ferrule terminating an optical fiber of the cable;
  a first body extending along the axis from a front end of the first body to a rear end of the first body, at least a portion of the fiber optic connector extending beyond the front end of the first body, the first body including:
   a tapered portion;
   a cable seal positioned in the tapered portion, the cable seal being adapted to sealingly engage the cable;
   a second positive locking element configured to engage the first positive locking element of the mating enclosure; and
   a cable receiving volume positioned in front of the cable seal; and
  a second body extending along the axis from a front end of the second body to a rear end of the second body, the second body being adapted to advance along the axis between a rearward position of the second body relative to the first body and a forwardmost position of the second body relative to the first body,
 wherein the sealing assembly is configured such that advancing of the second body forwardly to the forwardmost position without rotation of the second body about the axis causes the cable seal to compress radially towards the axis against the cable while a portion of the cable within the cable receiving volume remains loosely received within the cable receiving volume;
 wherein in the forwardmost position, the first body extends forwardly beyond the front end of the second body; and
 wherein when the sealing assembly is sealingly mated with the mating enclosure, a portion of the first body is received in the mating enclosure and the connector is received in the fiber optic adapter.

14. The assembly of claim 13, wherein the sealing assembly is rotatably lockable to the mating enclosure.

15. The assembly of claim 13, wherein the second body is rotatably lockable to the mating enclosure.

16. The assembly of claim 13, wherein the first body is an inner body and the second body is an outer body configured to advance along the axis over a portion of the inner body.

17. The assembly of claim 13, wherein the first body fully surrounds another portion of the fiber optic connector.

18. The assembly of claim 13, wherein the cable seal is positioned at the rear end of the first body.

19. The assembly of claim 13, wherein in the forwardmost position, the second body extends rearwardly beyond the rear end of the first body.

20. A sealing assembly, the sealing assembly extending along an axis from a front end of the sealing assembly to a rear end of the sealing assembly, and comprising:
 a cable;
 a fiber optic connector positioned at a front end of the cable, the fiber optic connector including a ferrule terminating an optical fiber of the cable;
 a first body extending along the axis from a front end of the first body to a rear end of the first body, at least a portion of the fiber optic connector extending beyond the front end of the first body, the first body including:
  a tapered portion;
  a cable seal positioned in the tapered portion, the cable seal being adapted to sealingly engage the cable;
  a positive locking element including a groove configured to engage a positive locking element of a mating enclosure; and
  a cable receiving volume positioned in front of the cable seal; and
 a second body extending along the axis from a front end of the second body to a rear end of the second body, the second body being adapted to advance along the axis between a rearward position of the second body relative to the first body and a forwardmost position of the second body relative to the first body,
 wherein the sealing assembly is configured such that advancing of the second body forwardly to the forwardmost position without rotation of the second body about the axis causes the cable seal to compress radially towards the axis against the cable while a portion of the cable within the cable receiving volume remains loosely received within the cable receiving volume;
 wherein in the forwardmost position, the first body extends forwardly beyond the front end of the second body; and
 wherein the positive locking element of the first body is configured to prevent relative rotation between the first body and the mating enclosure when the positive locking element of the first body and the positive locking element of the mating enclosure are engaged with each other.

* * * * *